United States Patent [19]
Jones et al.

[11] 3,874,451
[45] Apr. 1, 1975

[54] DETERMINATION OF OIL SATURATION IN A RESERVOIR

[75] Inventors: Stanley C. Jones; Robert W. Parson, both of Littleton, Ohio

[73] Assignee: Marathon Oil Company, Findlay, Ohio

[22] Filed: Apr. 12, 1974

[21] Appl. No.: 460,393

[52] U.S. Cl. .................................. 166/252, 73/155
[51] Int. Cl. ........................................... E21b 49/00
[58] Field of Search ...... 166/256, 250, 252; 73/152, 73/155

[56] References Cited
UNITED STATES PATENTS

| | | | |
|---|---|---|---|
| 2,598,932 | 6/1952 | Natho | 73/152 |
| 3,443,635 | 5/1969 | Gogarty et al. | 166/252 |
| 3,623,842 | 11/1971 | Deans | 166/252 |
| 3,771,360 | 11/1973 | Prats | 73/155 |

*Primary Examiner*—Stephen J. Novosad
*Assistant Examiner*—George A. Suckfield
*Attorney, Agent, or Firm*—Joseph C. Herring; Richard C. Willson, Jr.; Jack L. Hummel

[57] ABSTRACT

Oil saturation in a reservoir is determined by injecting into the reservoir a displacing fluid that will displace oil and water toward an observation well forming a "stable" oil-water bank, and measuring the arrival time of the stable oil-water bank at the well--a substantial difference in the rate of bottom-hole pressure change is realized once the bank arrives at the observation well. From these data, the oil saturation is determined by the formula:

$$S_{oi} = f_{ob}(1 - V_i) + f_{oi} V$$

wherein $S_{oi}$ is the average oil saturation between the injection well and observation well, $f_{ob}$ is the fractional flow of oil in the oil-water bank, $f_{oi}$ is the fractional flow of oil prior to arrival of the oilwater bank (equals nearly unity for an unflooded reservoir and about zero for a waterflooded reservoir), and $V_i$ is the fractional pore volume (based on the cylindrical volume from injection well to observation well) of displacing fluid injected into the reservoir at the time the oil-water bank first arrives at the observation well. The fractional flow of oil in the oil bank can be determined by sampling fluids in the observation well or by other known methods.

7 Claims, 2 Drawing Figures

PRESSURE, PSI vs TIME, HR FOR INJ AND OBS WELLS

RESERVOIR AT SATURATION CONDITIONS FOLLOWING A WATERFLOOD

STABLE OIL – WATER BANK

DISPLACING FLUID

PRESSURE, PSI vs TIME, HR FOR INJ AND OBS WELLS

DETERMINATION OF OIL SATURATION IN A RESERVOIR

BACKGROUND OF THE INVENTION

1. Field of the Invention

This invention relates to determining in situ the oil saturation of an oil-containing subterranean reservoir by injecting a displacing fluid into the reservoir and measuring the cumulative volume of the fluid injected at the time an oil-water bank arrives at an observation well at a desired distance from an injection well.

2. Description of the Prior Art

Logging techniques, e.g. electrical resistivity logging, have been used to determine oil saturation. However, usual logging methods only investigate the reservoir rock in the immediate vicinity of the wellbore and it is often difficult to obtain a realistic and practical value for oil saturation. Also, analyses of the core samples taken from the reservoir have been done to determine oil saturation—this method has been questioned because the core is subject to 1) flushing by the drilling fluid, and 2) changes in pressure and/or temperature as the core is brought to the surface, etc. Also, injection-production data have been used to calculate saturation changes during a reservoir exploitation.

Patents representative of the art include U.S. Pat. No. 3,628,842 to Deans, which teaches a method of determining the oil saturation in a reservoir by injecting a carrier fluid containing a reactant which is miscible with the mobile fluid within the reservoir, permitting the reactant to react and to form a product, the reactant and the product having differing partition coefficients between the carrier fluid and immobile phase within the reservoir, and then permitting the well to produce. By detecting the presence of the reactant and the product, the relative proportions of the mobile and immobile fluids within the reservoir can be determined.

SUMMARY OF THE INVENTION

Applicants' process is effected by injecting into an injection well a displacing fluid (displaces both the oil and water) and measuring the injected volume required to displace a stable oil-water bank to an observation well removed from the injection well. The fractional flow of oil in the stable oil-water bank is determined by analyzing fluid samples taken at the observation well, downhole measuring device, laboratory flow tests in core samples, or other means. From these data the average oil saturation between the injection well and the observation well is determined by:

$$S_{oi} = f_{ob} (1 - V_i) + f_{oi} V_i$$

as defined below.

This invention is primarily intended, but not limited, to determining oil saturation in reservoirs that have been previously waterflooded.

DESCRIPTION OF THE PREFERRED EMBODIMENTS

Figure 1:
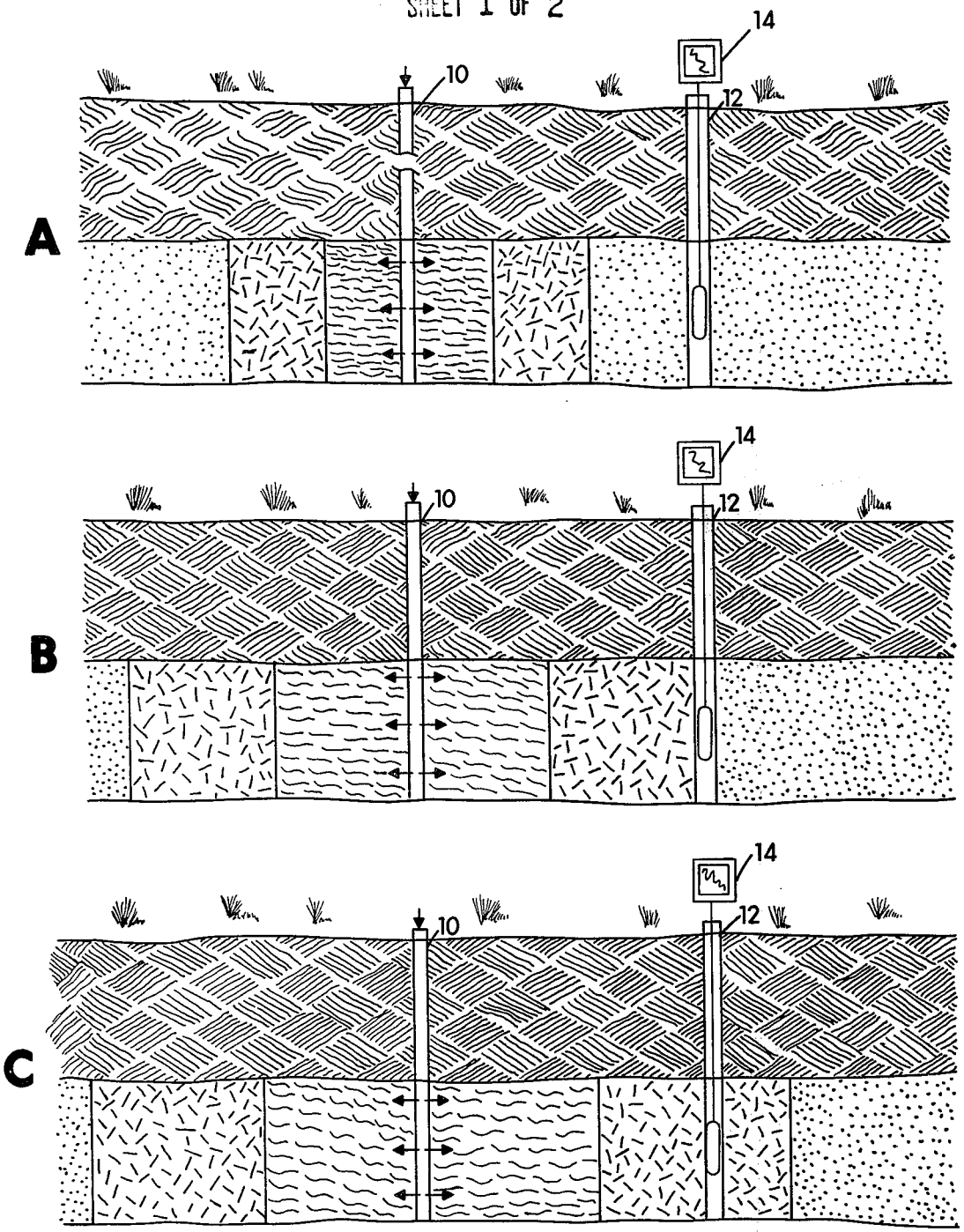
FIG. 1 is a schematic illustrating the basis of this invention. Progressively larger amounts of the displacing agent are injected through injection well 10 into the reservoir in 1A, 1B, and 1C, respectively. In 1A, the stable oil-water bank has not reached observation well 12; in 1B, the oil-water bank is at observation well 12; and, in 1C, the oil-water bank front has passed observation well 12. A sensitive pressure-measuring device 14 measures the pressure-time behavior at observation well 12. The amount of fluid injected is also recorded as a function of time.
Figure 1:
Figure 1:
Figure 1:
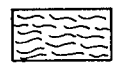

The displacing fluid can be any fluid which substantially displaces both the oil and water from the reservoir rock. Thus, displacing fluid must have both oil and water displacing properties to substantially "bank" the formation fluids ahead of the displacing fluid. Useful displacing fluids include anhydrous soluble oils, micellar dispersions (this term includes micellar solutions, microemulsion, hydrous soluble oils, "transparent" emulsions, etc.) hydrocarbons and substituted hydrocarbons that have both oil and water solubility characteristics. There are many examples of these displacing fluids within the prior art. Generally these displacing fluids contain one or more of hydrocarbon, surfactant, water, semi-polar organic compound (also defined as a cosurfactant, stabilizing agent, etc.), electrolyte, etc. The hydrocarbon can be substituted with a halogen, etc. to impart desired properties; the semi-polar organic compound can be, e.g. an alcohol, ketone, ether, aldehyde, ester, acid, or mixtures thereof, or a compound containing one or more functional groups such as hydroxy, oxy, epoxy, halide, etc. The surfactant can be anionic, nonionic, or cationic. Preferably the displacing fluid is a micellar dispersion and more preferably it is designed to displace all of the oil and water.

The displacing fluid is injected into an injection well and displaced radially away from the well. The observation well is disposed at any distance from the injection well; but, from a practical standpoint, is from about 5 to about 100 feet and preferably about 20 to about 40 feet from the injection well. The amount of displacing fluid injected should be sufficient to displace both the oil and the water until the leading edge of the stable oil-water bank has passed the observation well.

A bottom hole pressure measuring device is placed in the observation well to record pressure-time data. When the oil-water bank's leading edge reaches the observation well, the mobility of the oil-water bank, compared to the mobility of the reservoir fluids ahead of the bank, will cause a discontinuous change in the slope of the pressure-time data. Knowing the time of this slope change, one can determine the total amount of displacement fluid injected at that time.

As the displacing fluid traverses from the injection well to the observation well, it forms an oil-water bank of substantially constant properties (both saturation and mobility). Arrival of this bank at the observation well causes a distinct change in the rate of pressure buildup at the observation well in addition to a noticeable increase in oil saturation at the observation well. The bank is referred to herein as a "stable" oil-water bank. The initial oil saturation in the reservoir is related to the initial fractional flow of the formation fluids and the oil bank fractional flow and saturation according to the following equation:

$$S_{oi} = S_{ob} - V_i (f_{ob} - f_{oi})$$

wherein
$S_{oi}$ = Average initial oil saturation (normally close to waterflood residual oil saturation) between the injection and observation wells prior to the start of solvent injection.
$S_{ob}$ = Oil saturation in the oil-water bank formed when the displacing fluid is injected.
$V_i$ = Volume (pore volume) of displacing fluid injected when oil bank first arrives at observation well (based on the radial volume from the injection well to the observation well).
$f_{ob}$ = Fractional flow of oil in oil-water bank.
$f_{oi}$ = Fractional flow of oil before arrival of oil-water bank. However, if the displacing fluid displaces all of the reservoir fluids ahead of it, then $S_{ob}$ becomes numerically equal to $f_{ob}$ and the equation becomes:

$$S_{oi} = f_{ob} (1 - V_i) + f_{oi} V_i$$

The fractional flow of oil before arrival of the oil bank ($f_{oi}$) is generally small in a previously waterflooded reservoir and can be ignored in most situations; the oil saturation then can be calculated from the formula:

$$S_{oi} = f_{ob} (1 - V_i)$$

The fractional flow of oil in the oil bank (i.e. $f_{ob}$), can be determined by sampling the fluids within the observation well, or from laboratory simulations of the reservoir displacement process.

The displacing fluid can be followed by another fluid dissimilar to the displacing fluid. This may be desired if the observation well is at a relatively large distance from the injection well. In this situation, the $V_i$, from the previous equation, will include the displacing fluid plus the "other dissimilar fluid." However, the system must be designed so that premature fingering will not occur before the stable oil-water bank reaches the observation well.

It may be desirable to have two or more observation wells at different azimuths from the injection well to determine symmetry of the fluid movement. Also, two observation wells at different distances along the same azimuth may be desired to provide a check on the bank propagation properties. Pressure measurements can be made between the two different distance observation wells to determine the bank mobility between the two observation wells. Reservoir pressure measuring devices such as taught in U.S. Pat. No. 3,734,182 are useful.

Although the process of this invention has generally been described by the example of determining oil saturation following a waterflood, the method can be used for other reservoir conditions. For example, this technology can be used to determine oil saturation in a virgin reservoir at irreducible connate water saturation, in which case $f_{oi}$ will be one. The method will not work if the reservoir oil saturation is equal to the stabilized oil-water bank oil saturation, and/or the mobility of the fluids flowing ahead of the stabilized oil-water bank is equal to the mobility of the stabilized oil-water bank.

The amount of displacing fluid needed to obtain an oil-water bank at the observation well will depend, of course, on the particular reservoir, the particular ratios of hydrocarbon and water within the reservoir, and the property of the displacing fluid to displace the formation fluids. From a practical standpoint, about 10 to about 100 percent and preferably about 25 to about 50 percent pore volume of the displacing fluid, which is preferably a micellar dispersion, is injected to obtain an oil-water bank at the observation well. Pore volume is calculated as the radial area to the observation well times the thickness of the reservoir that is being flooded with the displacement fluid times the porosity.

If the reservoir being flooded is substantially stratified, each zone of substantially different permeability should be isolated and individually flooded to determine oil saturation by the process of this invention.

The following example is presented to teach specific working embodiments of the invention:

EXAMPLE

Figure 2:
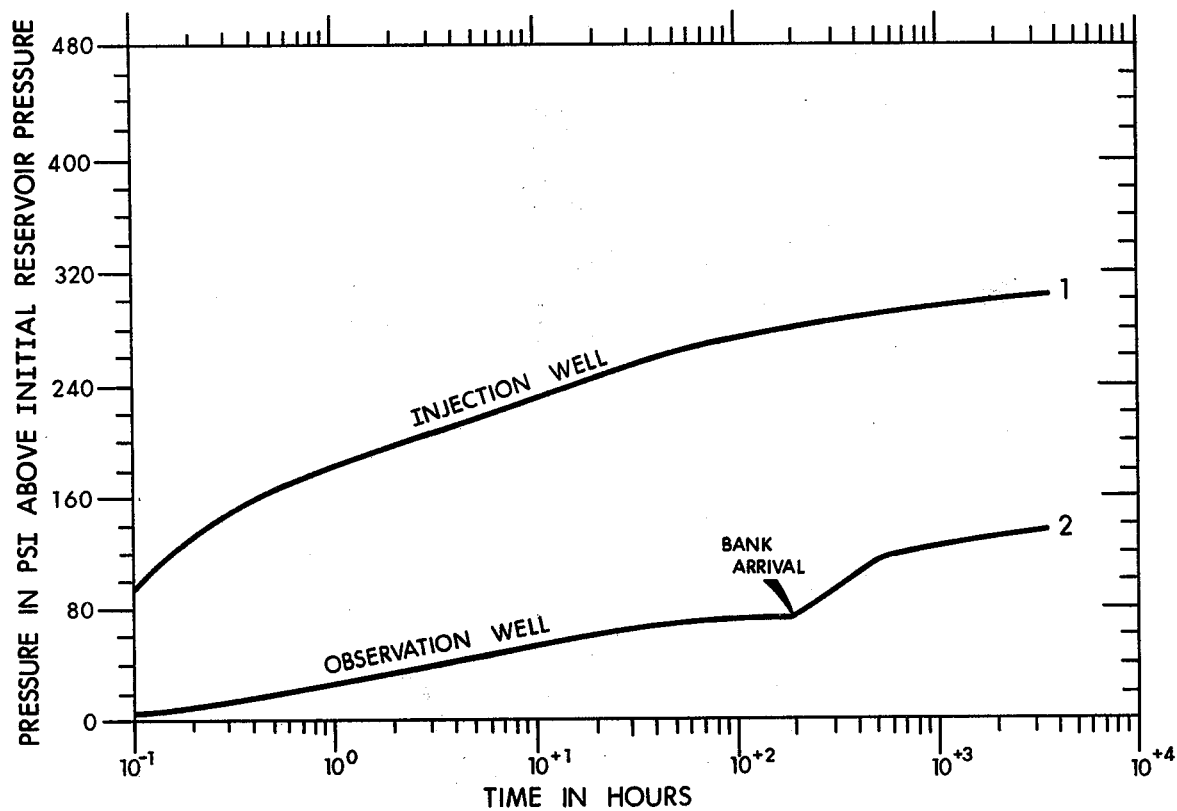
FIG. 2 is a specific example of the expected results. This drawing shows the pressure in injection well 10 and observation well 12 in psi (both presented as pressure above initial steady reservoir pressure) versus time in hours for a constant displacing fluid injection rate. The sharp change in the slope on the observation well plot occurs when the stable oil-water bank arrives at the observation well, i.e. when the reservoir is in the condition of FIG. 1B.

A reservoir has the following properties: permeability = 140 md., porosity = 20%, thickness = 30 ft, total compressibility = $10^{-5}$ psi$^{-1}$, injector wellbore radius = 0.28 ft., circular reservoir with injection well at center, reservoir radius = 500 ft, and constant pressure at outer boundary. The reservoir is at residual oil saturation and has an oil saturation of 35%, and a total mobility of 12.73 md/cp. A micellar dispersion composed of hydrocarbon, petroleum sulfonate, water, alcohol, and electrolyte, is injected into the reservoir at a rate of 60 barrels per day. The observation well is located 19.3 feet from the injection well. The attached FIG. 2 shows the results from the calculation of pressure behavior of the injection well and the observation well as a function of time on a logarithmic scale. The oil-water bank arrival at the observation well is noted on the graph by the noticeable change in the slope. The oil-water bank arrives at the observation well 190 hours after start of injection. Pore volume of displacing fluid injected at the time the oil bank arrives at the observation well is calculated by:

$$V_i = \frac{Qt}{\pi r^2_{ow} h \phi}$$

$$= \frac{60(BPD) \times 190/24 \text{ (days)} \times 5.6146 \text{ (ft}^3\text{/bbl)}}{3.1416 \times 19.3^2 \text{ (ft}^2\text{)} \times 30 \text{ (ft)} \times .20} = 0.38$$

From laboratory experiments on cores cut from the observation well, it is determined that the fractional flow of oil in the oil bank is 55 percent. From these quantities the average oil saturation between the injection well and the observation well is determined to be 34 percent by the following equation:

$$S_{oi} = f_{ob} (1 - V_i) = 0.55 (1 - .38) = 0.34$$

The 34 percent compares very favorably with the known 35 percent value oil saturation.

The above data are not meant to limit the invention in any way. Rather, all equivalents obvious to those skilled in the art are meant to be incorporated within the scope of the invention as defined within the specification and appended claims.

What is claimed is:

1. A process of determining in situ the average oil saturation in an oil-bearing reservoir in fluid communication with at least one observation well removed from the injected well, and wherein the oil saturation in the reservoir is not equal to the oil saturation in the below defined oil-water bank and/or the mobility of the fluids flowing ahead of the oil-water bank is not equal to the mobility of the fluids within the oil-water bank, the process comprising injecting into the reservoir sufficient volume of a displacing fluid to substantially displace the formation fluids toward the observation well and to obtain a stable oil-water bank at the observation well, determining the time of arrival of the oil-water bank at the observation well, and thereafter determining the average oil saturation by the following formula:

$$S_{oi} = f_{ob}(1 - V_i) + f_{oi} V_i$$

wherein $S_{oi}$ is the average oil saturation between the injection well and the observation well, $f_{ob}$ is the fractional flow of oil in the oil-water bank, $V_i$ is the pore volume of displacing fluid injected into the injection well to obtain arrival of the oil-water bank at the observation well, and $f_{ob}$ is the fractional flow of oil before arrival of the oil-water bank.

2. The process of claim 1 wherein at least a majority of the displacing fluid is a micellar dispersion.

3. The process of claim 1 wherein the reservoir is under primary production.

4. The process of claim 1 wherein the reservoir is at or substantially close to residual oil saturation.

5. The process of claim 1 wherein two or more observation wells on different azimuths are in fluid communication with the injection well.

6. The process of claim 1 wherein two or more observation wells at different distances on the same azimuth are in fluid communication with the injection well.

7. The process of claim 1 wherein the observation well has pressure measuring capabilities from which the arrival time of the oil-water bank can be determined.

* * * * *

UNITED STATES PATENT OFFICE
CERTIFICATE OF CORRECTION

Patent No. 3,874,451  Dated April 1, 1975

Inventor(s) Stanley C. Jones et al

It is certified that error appears in the above-identified patent and that said Letters Patent are hereby corrected as shown below:

Abstract, formula: Add --$V_i$-- instead of "V".

Claim 1, line 14: Delete "fob" and insert --$f_{oi}$--.

Signed and Sealed this thirtieth Day of December 1975

[SEAL]

Attest:

RUTH C. MASON
Attesting Officer

C. MARSHALL DANN
Commissioner of Patents and Trademarks